United States Patent [19]

Hiratsuka et al.

[11] Patent Number: 5,208,663
[45] Date of Patent: May 4, 1993

[54] COLOR IMAGE PROCESSING APPARATUS PROVIDED WITH AN IMAGE DISCRIMINATION MEANS

[75] Inventors: Seiichiro Hiratsuka; Koji Washio; Masahiko Matsunawa, all of Tokyo, Japan

[73] Assignee: Konica Corporation, Tokyo, Japan

[21] Appl. No.: 918,136

[22] Filed: Jul. 23, 1992

Related U.S. Application Data

[63] Continuation of Ser. No. 496,026, Mar. 20, 1990.

[30] Foreign Application Priority Data

Mar. 22, 1989 [JP] Japan ............................ 1-69909
Apr. 21, 1989 [JP] Japan ............................ 1-101967
Apr. 28, 1989 [JP] Japan ............................ 1-10983

[51] Int. Cl.$^5$ ............................... H04N 1/46
[52] U.S. Cl. ........................ 358/75; 358/78; 358/80
[58] Field of Search ............ 358/75, 77, 78, 80

[56] References Cited

U.S. PATENT DOCUMENTS

| | | | |
|---|---|---|---|
| 4,656,505 | 4/1987 | Yamada et al. | 358/75 |
| 4,682,216 | 7/1987 | Sasaki et al. | 358/75 |
| 4,812,899 | 3/1989 | Kueppers | 358/75 |
| 4,887,150 | 12/1989 | Chiba et al. | 358/75 |
| 4,929,979 | 5/1990 | Kimoto et al. | 358/80 |
| 4,937,662 | 6/1990 | Matsunawa et al. | 358/75 |
| 4,980,758 | 12/1990 | Matsunawa et al. | 358/80 |
| 5,031,035 | 7/1991 | Abe | 358/75 |
| 5,047,844 | 9/1991 | Ikeda et al. | 358/75 |

Primary Examiner—Jose L. Couso
Attorney, Agent, or Firm—Finnegan, Henderson, Farabow, Garrett & Dunner

[57] ABSTRACT

An image processing apparatus including input terminals for introducing color image data in the form of pixels obtained by reading an original image, a classifying circuit for classifying a color of each pixel as either an achromatic color, a chromatic color, or an intermediate color by processing the color image data in accordance with classifying criterion, a discrimination circuit for discriminating a kind of the original image on the basis of the color image data, the classifying circuit being capable of changing the classifying criterion in accordance with the discriminated kind of the original image.

7 Claims, 12 Drawing Sheets

X: TARGET PIXEL

FIG. 12

| NUMBER | COLOR PATTERN | | | | | | | CHANGE IN TARGET PIXEL |
|---|---|---|---|---|---|---|---|---|
| 1 | W | W | W | I | C | B | B | I → B |
| 2 | W | W | C | I | C | B | W | I → C |

PERIPHERY PIXEL  
TARGET PIXEL  
PERIPHERY PIXEL

I : INTERMEDIATE COLOR
W : WHITE
B : BLACK, GRAY
C : CHROMATIC

FIG. 13

| N | M | NUMBER OF COLOR PATTERS | PATTERN SIZE |
|---|---|---|---|
| 2 | 3 | 8 | 1 × 3 |
|   | 5 | 32 | 1 × 5 |
|   | 7 | 128 | 1 × 7 |
| 3 | 3 | 27 | 1 × 3 |
|   | 5 | 243 | 1 × 5 |
|   | 7 | 2187 | 1 × 7 |
| 4 | 3 | 64 | 1 × 3 |
|   | 5 | 1024 | 1 × 5 |
|   | 7 | 16384 | 1 × 7 |
|   | 9 | 262144 | 3 × 3, 1 × 9 |

COLOR IMAGE PROCESSING APPARATUS PROVIDED WITH AN IMAGE DISCRIMINATION MEANS

This application is a continuation of U.S. patent application Ser. No. 07/496,026 filed Mar. 20, 1990, now abandoned.

BACKGROUND OF THE INVENTION

The present invention relates to a color image processing apparatus and, more particularly, to an improved color image processing apparatus with excellent color reproduction.

Conventionally, a color image processing apparatus has been used in which a color image is recorded on a recording paper in such a manner that; a color image on a photograph or a text is optically read out by separating it into red R, green G, and blue B; these colors are converted into recording colors such as yellow Y, cyan C, black K, and the (color reproducing or color correction); and the color image is recorded on a recording paper by electrophotographic color image processing equipment according to the converted colors.

FIG. 8 is a schematic illustration which shows how colors are discriminated by the above-described color image processing apparatus, wherein the apparatus discriminates between a chromatic color and an achromatic color. A cube in FIG. 2 illustrates color discrimination as follows. An axis indicated by arrow mark R represents the density of R, an axis indicated by arrow mark B represents the density of B, and an axis indicated by arrow mark G represents the density of G. Accordingly, the leftside down corner indicated by the mark R,G,B DENSITY MINIMUM where the density of R, G, and B is zero, represents white, and the rightside upper corner indicated by the mark R,G,B DENSITY MAXIMUM, where the density of R, G, and B is maximum, represents black. For that reason, the region which links white with black in the cube represents ah achromatic color (gray) and outside of this region represents chromatic colors.

Concerning the setting of the achromatic color region, there are reciprocal problems as follows.

(1) The achromatic color region is required to be as wide as possible so that color ghosting (unnecessary colors which appear at the edge of black letter image) can be reduced, wherein the color ghosting is caused by shear of color and chromatic aberrations when black letters are processed.

(2) The achromatic color region is required to be as narrow as possible so that low chroma colors (for instance brown, dark blue, purple, and the like) can be precisely reproduced when a color gradation picture is processed.

Since these reciprocities exist, a compromise used to be made between case (1) and case (2) by setting the achromatic color region in such a manner that both cases are allowable.

In spite of that, colors of low chroma have been unsatisfactory when a color gradation picture is processed, since low chroma portions have been reproduced in black since the achromatic color region has a predetermined range as explained above.

On the other hand, even when a black letter is reproduced, the result is unsatisfactory as color ghosting appears.

SUMMARY OF THE INVENTION

The present invention has been accomplished to solve the problems described above. Accordingly, it is an object of the present invention to provide a color image processing apparatus which can improve reproduction of low chroma of the color gradation picture and can reduce color ghosting of black letters.

The characteristics of the color image processing apparatus of the present invention to solve the problems described above will be explained as follows. A color image processing apparatus which processes a color image, separating the read-out-color signal into a chromatic color and an achromatic color, comprises a color discriminating means to discriminate the kind of images according to the color-read-out-signal, wherein the chromatic color region and the achromatic color region can be changed according to the results of color discrimination by the color discriminating means.

Another characteristics of the color image processing apparatus of the present invention will be described as follows. A color image processing apparatus which processes a color image, separating the read-out color signal into a chromatic color and an achromatic color, is composed in such a manner that; the classifying criterion to separate a chromatic color from an achromatic color, is changed according to the mode set from the outside of the apparatus: and the image processing conducted in the chromatic color region is different from that conducted in the achromatic color region.

Furthermore, the characteristics of the color image processing apparatus of the present invention will be described as follows. A color image processing apparatus which generates the color codes to discriminate between a chromatic color pixel and an achromatic color pixel in a document, and which conducts image processing including color ghosting correction using the color codes, is composed in such a manner that; the apparatus generates the color codes of a chromatic color, an achromatic color, and an intermediate color which belongs to the intermediate region between a chromatic color and an achromatic color; and the apparatus changes the intermediate color code into the chromatic or the achromatic color code when color ghosting correction is conducted.

The chromatic color region and the achromatic color region can be changed according to the results of color image discrimination by the color processing apparatus of the present invention.

Furthermore, in the color image processing apparatus of the present invention, the classifying criterion of a chromatic color and an achromatic color can be changed according to the mode set from the outside of the apparatus, and the image processing conducted in the chromatic color region is different from that conducted in the achromatic color region.

In the color image processing apparatus of the present invention, the color codes of a chromatic color, an achromatic color, and an intermediate color are changed into the color codes of a chromatic color or an achromatic color when color ghosting is conducted.

BRIEF DESCRIPTION OF THE DRAWINGS

FIG. 12 is a table to explain the patterns of color codes.

FIG. 13 is a table which shows the relation between the pattern sizes to correct color ghosting and the number of the patterns.

DETAILED DESCRIPTION OF THE INVENTION

Figure 1:
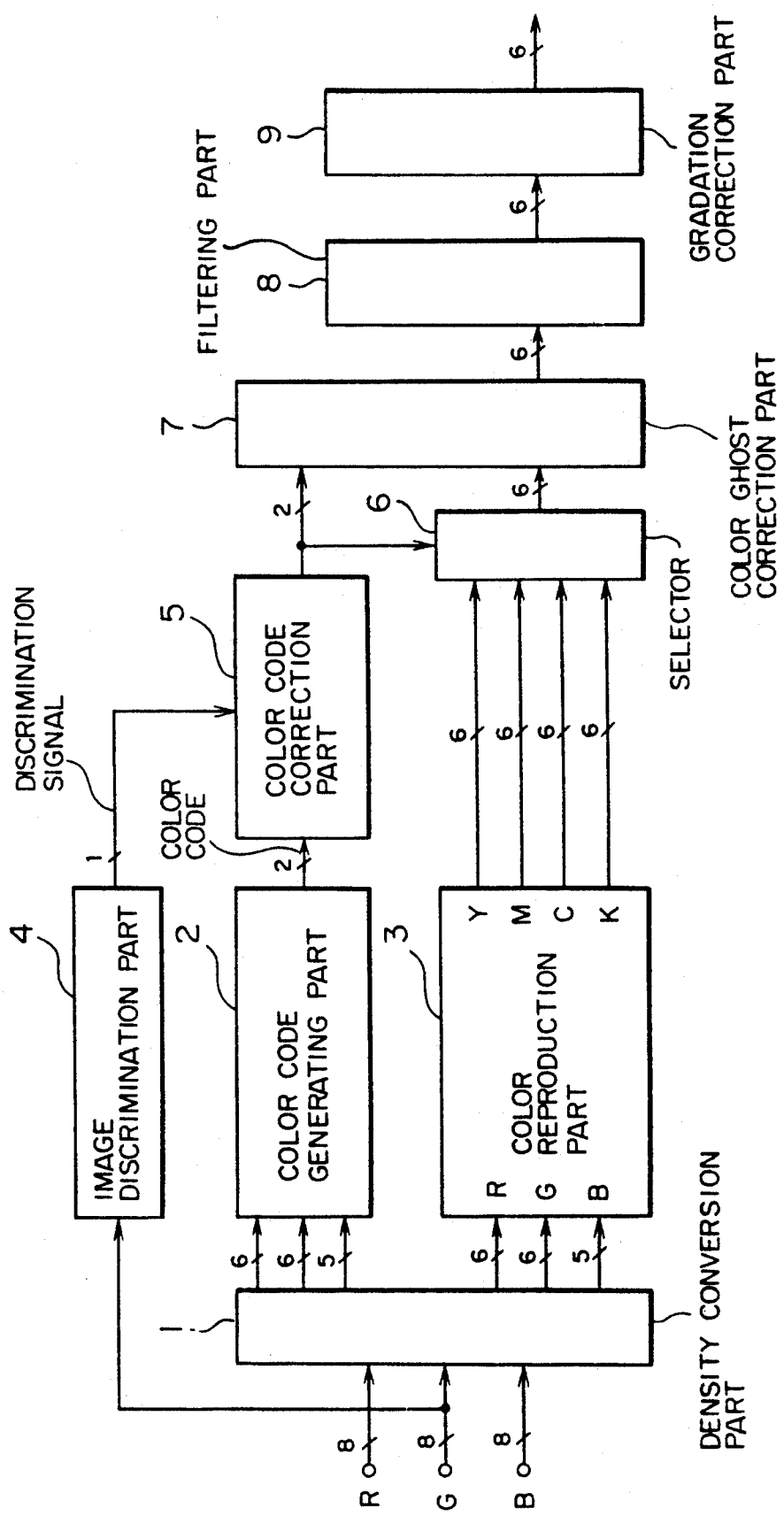
FIG. 1 is a block diagram which illustrates one of the examples of the present invention.

Referring to the drawings, an example of the present invention will be described in detail as follows.

FIG. 1 is a block diagram which illustrates an example of the present invention. In FIG. 1, the numeral I is a density conversion part which converts 8-bit digital data of R, G, and B given from outside, to 6-bit digital data of R, 6-bit digital data of G, and 5-bit digital data of B. The numeral 2 is a color code generating part which: receives the R, G, and B data from the density conversion part 1; discriminates white, black, chromatic colors, and intermediate colors; and outputs color codes. The numeral 3 is a color reproduction part which generates data of Y, M, C, and K after receiving data of R, G, and B, wherein the data is processed to reproduce colors. The numeral 4 is an image discrimination part which receives 8-bit data of G and discriminates between a black lettered text image and a color gradation picture image according to the density gradient of 8-bit data of G. The numeral 5 is a color code correction part which receives data from the image discrimination part 4 and classifies an intermediate color code into chromatic code and achromatic code. The numeral 6 is a selector which selectively passes the density data of Y, M, C, and K sent from the color reproduction part 3 according to the corrected color codes sent from the color code correction part 5. The numeral 7 is a color ghosting correction part which corrects color ghosting. The numeral 8 is a filtering part which filters color codes. The numeral 9 is a gradation correction part which corrects the gradation characteristics.

The operation of the apparatus of this example will be explained as follows, after which the principal portion of the present invention will be described.

A document image is read out by an image reader which is not illustrated in the drawings and the read-out data is converted into 8-bit digital data of R, G, and B. The digital data of R, G, and B is supplied to the density conversion part 1. At the density conversion part 1, the 8-bit data is converted into 6-bit data of R, 6-bit data of G, and 5-bit data of B in accordance with the visual characteristics of a human being. The data of R, G, and B outputted from the density conversion part 1 is imposed on the color code generating part 2 and the color reproduction part 3. The color code generating part 2 outputs the color codes which indicate which colors of white, black, chromatic or achromatic colors, and intermediate colors each pixel belongs to, according to the level of the data of R, G, and B.

Figure 2:
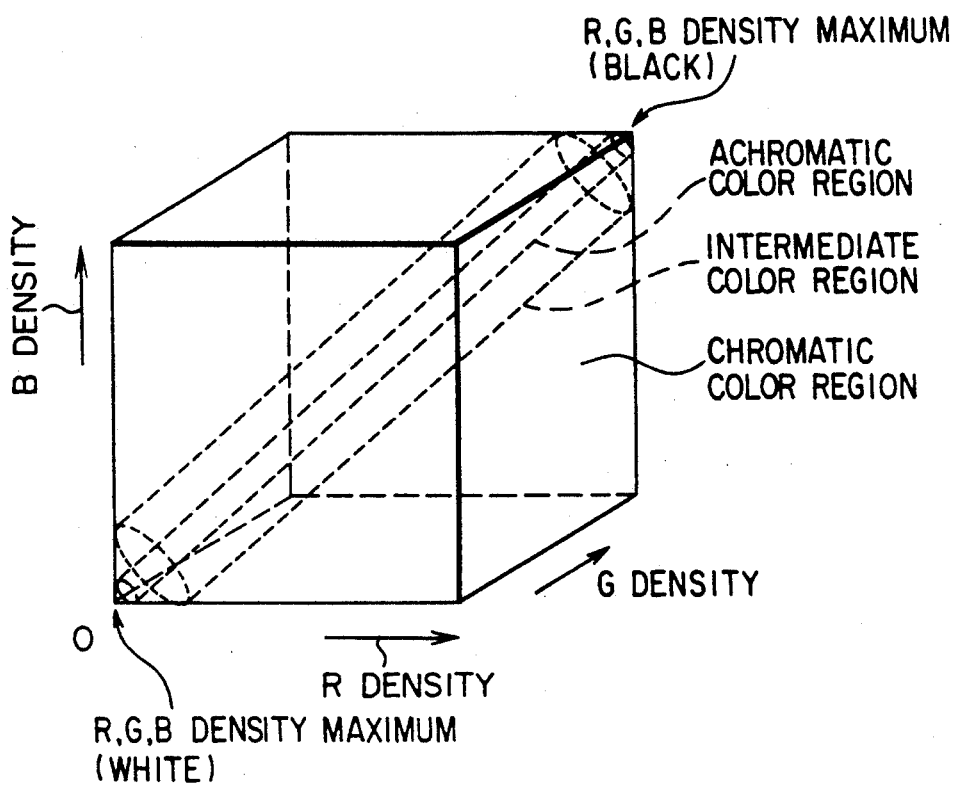
FIG. 2 is a schematic illustration which shows color code generation.

FIG. 2 is a schematic illustration which shows how color codes are generated in the color code generation part 2. In the cube illustrated in FIG. 2, the axis indicated by the arrow mark R represents the density of R. The axis indicated by the arrow mark B represents the density of B. The axis indicated by the arrow mark G represents the density of G. Accordingly, a leftside front down corner of the cube indicated by the arrow mark R,G,B DENSITY MINIMUM represents white, wherein the density of R, G, and B is zero at the corner. (color code of white ; 00) A corner indicated by the arrow mark R,G,B DENSITY MAXIMUM represents black, wherein the density of R, G. and B is maximum at the rightside back upper corner. The achromatic color region which links white with black is set up in such a manner that the region is narrow. (color code of the achromatic color region ; 11) The intermediate color region which is relatively wide is set up. (color code of the intermediate color region ; 01) The region other than the achromatic color region and the intermediate color region is defined as the chromatic color region. (color code of the chromatic color region ; 10) To go into more detail, only the region the color of which is always an achromatic color (black) in both cases of a black lettered text and a color gradation drawing, is defined as the black region. The region in which the color is low chroma in the case of a color gradation drawing and there is a possibility of color ghosting in the case of a black lettered text, is defined as the intermediate color region.

Accordingly, the color code generating part 2 outputs 2-bit color codes described above. (2-bit color codes of white ; 00, black ; 11, intermediate colors ; 01, chromatic colors ; 10)

These color codes are supplied to the color code correction part 5. At the color code correction part 5, the intermediate color code (01) is corrected to black color code (11) or a chromatic color code (10) according to a discriminating signal generated by the image discrimination part 4, wherein the discriminating signal is a signal to discriminate between a color gradation picture and a black lettered text. When a color gradation picture is processed, the intermediate color code is corrected to the chromatic color code so as to increase reproducibility of the colors of low chroma. When a black lettered text is processed, the intermediate color code is corrected to the black color code so as to prevent color ghosting from appearing.

Figure 3:
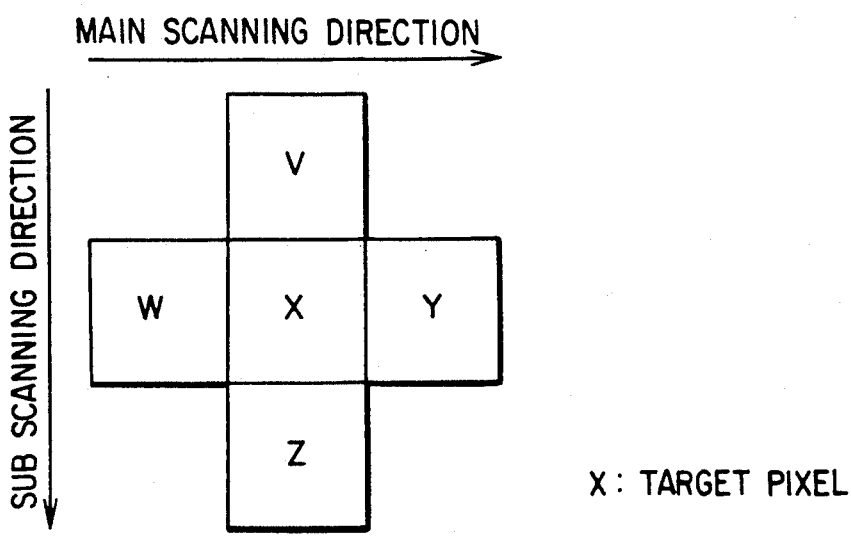
FIG. 3 is a schematic illustration which explains image discrimination.

FIG. 3 is a schematic illustration which shows how images are discriminated. In FIG. 3, X is the target pixel of an image to be discriminated. V is the pixel on a scanning line above the line on which the target pixel is placed. W is the pixel ahead of the target pixel. Y is the pixel behind the target pixel. Z is the pixel on the scanning line below the target pixel.

The density gradient will be found utilizing the density data (8-bit) of each pixel. Density gradient S of the target pixel X can be found by the following expression.

$$S = |V-X| + |W-Y| \tag{1}$$

Parameter S for the density gradient of the pixel X, using the density data of the peripheral pixels, can be found in this way.

The following parameters S' and S" can also be considered.

$$S' = |V-X| + |W-X| \tag{2}$$

$$S'' = |V-Z| + |W-Y| \tag{3}$$

However, in the expression (2), only two peripheral pixels are used. Therefore, S' has a disadvantage in that the discriminating ability is not sufficient. In the expression (3), it is necessary to use three pixels in the sub-scanning direction. Consequently, S" has a disadvantage in that larger image memory capacity is needed. In conclusion, S in the expression (1) is adopted because it has a high discriminating ability, wherein a memory with small capacity is used.

Figure 4:
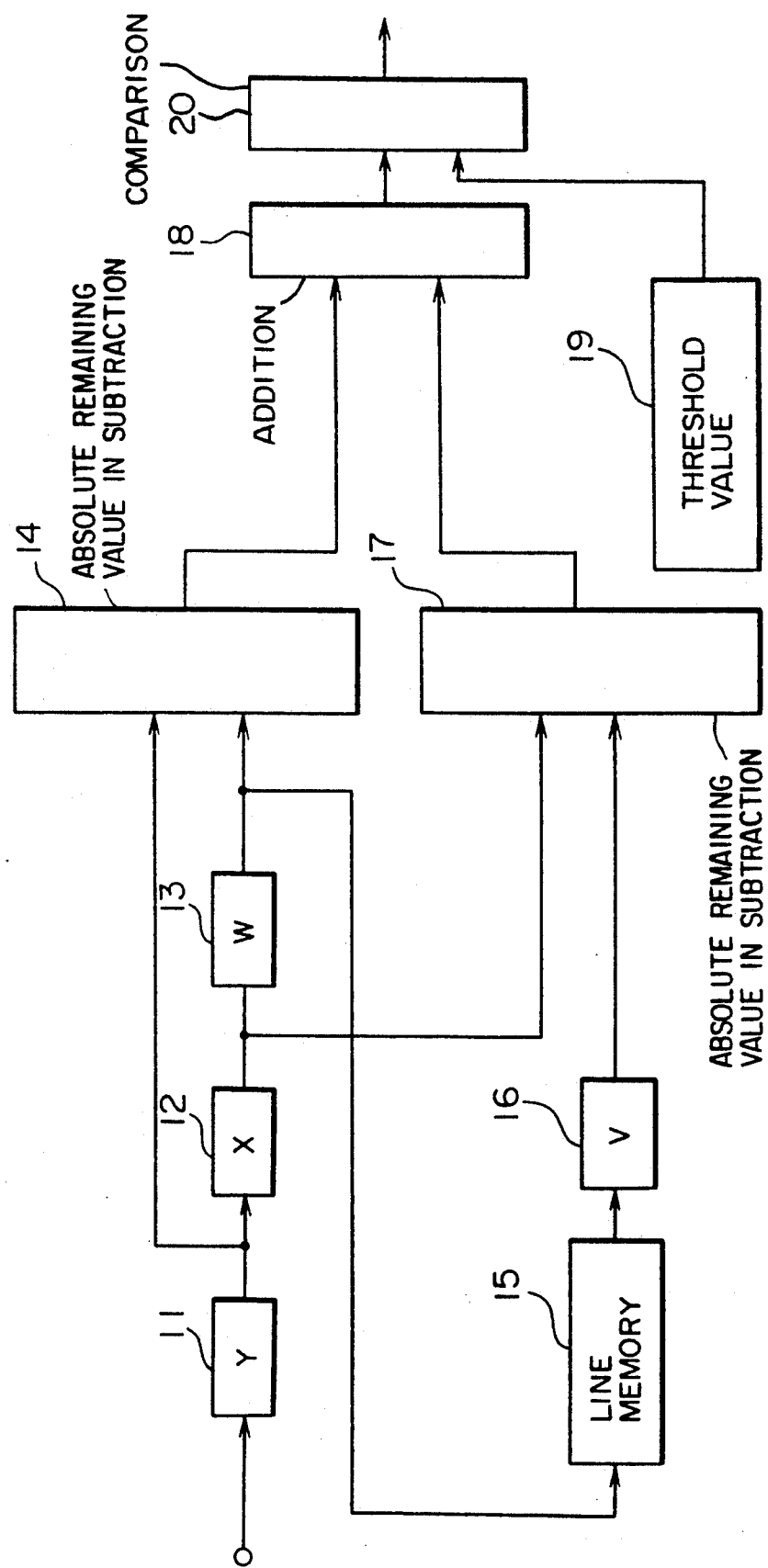
FIG. 4 is a schematic diagram which illustrates the image discrimination system.

FIG. 4 is a schematic block diagram which illustrates the details of the image discrimination part 4. In FIG. 4, the numeral 11 is a register which stores the data of pixel Y. The numeral 12 is a register which stores the data of pixel X. The numeral 13 is a register which stores the data of pixel W. The numeral 14 is a subtracting and absolute value calculating circuit in which W is subtracted by Y and an absolute value ($|W-Y|$) is calculated. The numeral 15 is a line memory. The numeral 16 is a register which stores the data of pixel V. The numeral 17 is a subtracting and absolute value calculating circuit in which V is subtracted by X and an absolute value ($|V-X|$) is calculated. The numeral 18 is an addition circuit in which the output from the subtracting and absolute value calculating circuit 14 and that of the circuit 17 are added ($|W-Y|+|V-X|$). The numeral 19 is a threshold value generating circuit in which the threshold value of the density gradient is generated. The numeral 20 is a comparative circuit in which the image discriminating signal is generated by comparing the added output of the addition circuit 18 with the threshold value.

Figure 5:
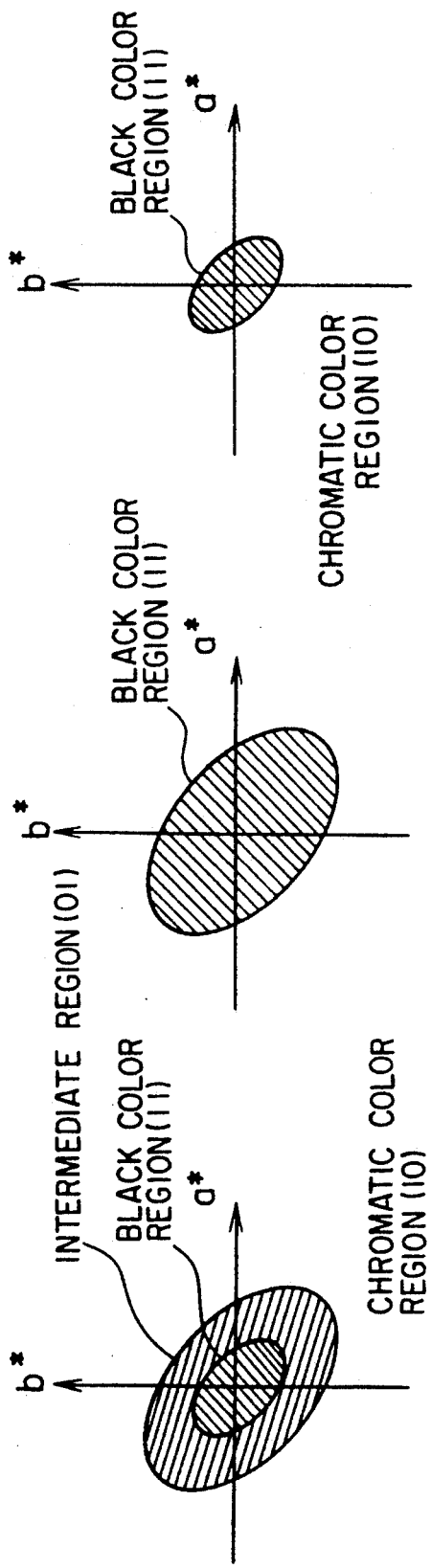
FIG. 5-A, FIG. 5-B, and FIG. 5-C are schematic illustrations which show the color separation process.

Image discrimination will be explained below from the viewpoint of colors. In L*a*b* uniform color space defined by CIE, the color codes of black, intermediate colors, and colors are set up in the color regions on the chromaticity phase of a*b* as illustrated in FIG. 5-A. The regions of the color codes are determined according to the value Q defined by the following equation, and the readout levels (8-bit; 0 to 255) of R, G, and B.

$$Q = \frac{\sqrt{0.75(R-W)^2 + 1.5(G-W)^2 + 0.75(B-W)^2}}{\sqrt{W_2 \times W_0}}$$

$$W_2 = (R + 2G + B)/5$$

$$W_0 = 255$$

in the condition of:
(1) $Q \leq 15$ and $G > 180$
   Color code: 00 (white)
(2) $Q \leq 7.5$ and $G \leq 180$
   Color code: 11 (black)
(3) $7.5 \leq Q \leq 15$ and $G \leq 180$
   Color code: 01 (intermediate colors)
(4) $Q > 15$ Color Code: 10 (colors)

Parameter S is found by the image discrimination part 4 as described above and the value S is compared with the threshold value T. In the case of $S > T$, the image discrimination part 4 determines that the image is black lettered text and the intermediate region is defined as the black region as illustrated in FIG. 5-B. In the case of $S \leq T$, the image discrimination part 4 determines that the image is a color gradation picture and the intermediate region is defined as the chromatic region as illustrated in FIG. 5-C.

Figure 6:
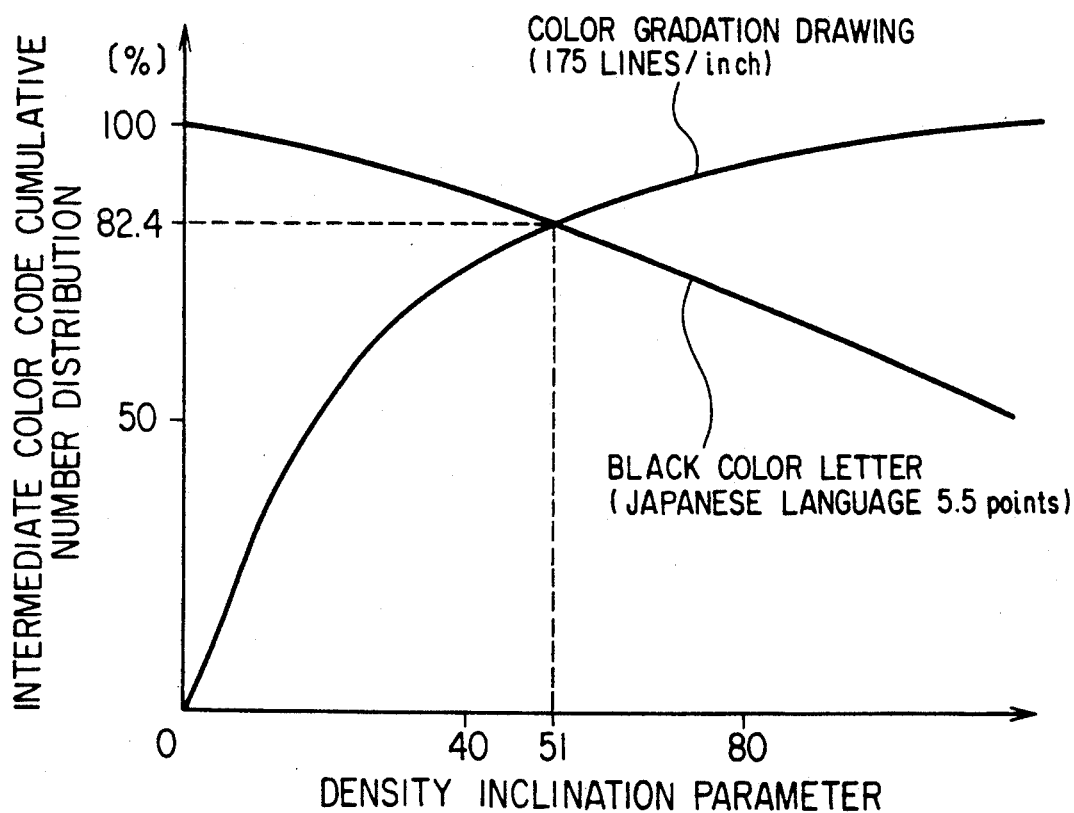
FIG. 6 is a characteristic chart which shows the relation between the density gradient and image discrimination.

FIG. 6 is a graph showing a cumulative distribution of the intermediate color code which was found from a histogram of parameter S of the density gradient of the intermediate colors. In the graph, the curve indicated by COLOR GRADATION DRAWING shows the ratio of the chromatic color code and the curve indicated by BLACK COLOR LETTER shows the ratio of the black code. The discriminating ratios become equal at the point where two curves intersect on the graph. In this case, the threshold value is 51 and the discriminating ratio is 82.4%. Accordingly, the threshold value is set to 51 and image discrimination is conducted discriminating between a color gradation drawing and a black letter text.

After the color codes are corrected as described above, the data of Y, M, C, and K passes through the selector 6 according to the corrected color codes and the scanning codes (the code of the color which is printed by the printer). In other words, when the corrected color represents a chromatic color (10), the data of Y, M, and C from the color reproduction part 3 passes through the selector 6. When the corrected color code represents black, the data of K from the color reproduction part 3 passes through the selector 6.

After the color ghosting correction, filtering, and the gradation correction are conducted, the data is outputted. The data is supplied to the printer installed outside the color processing apparatus and the color image is formed on a recording paper.

As described above, in the present invention, the color codes are separated into the codes which represent a chromatic color, black, white, and an intermediate color, and the color code of an intermediate color is separated into black or a chromatic color according to the results of the image discrimination. Therefore, the intermediate color region becomes the black region in the case of a black letter text. Accordingly, the color ghosting never occurs. In the case of a color gradation drawing, the intermediate region becomes the chromatic color region. As a result, the low chroma colors can be finely reproduced.

Figure 7:
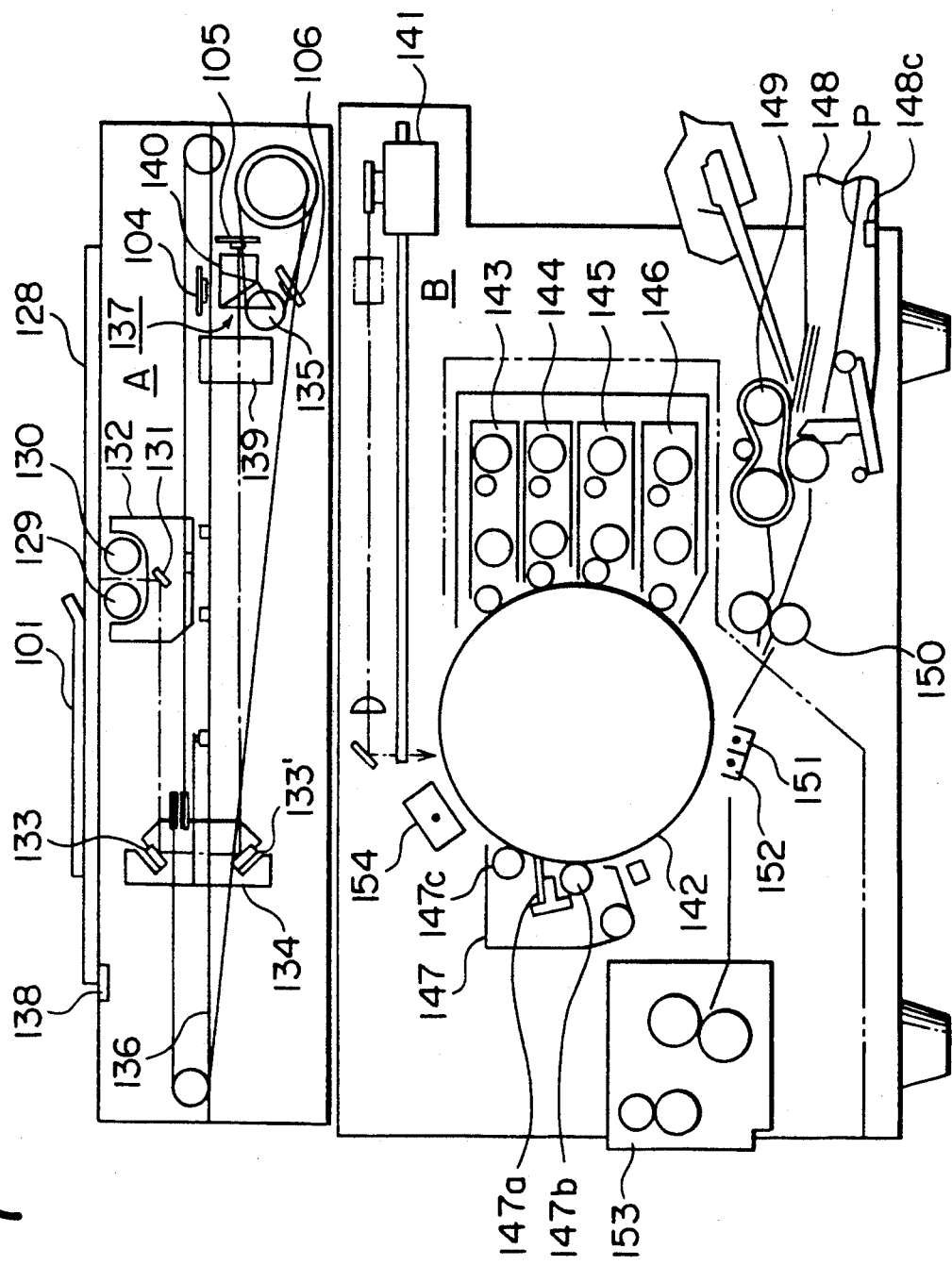
FIG. 7 is a schematic illustration which shows the whole structure of an electrostatic color copier.
Figure 8:
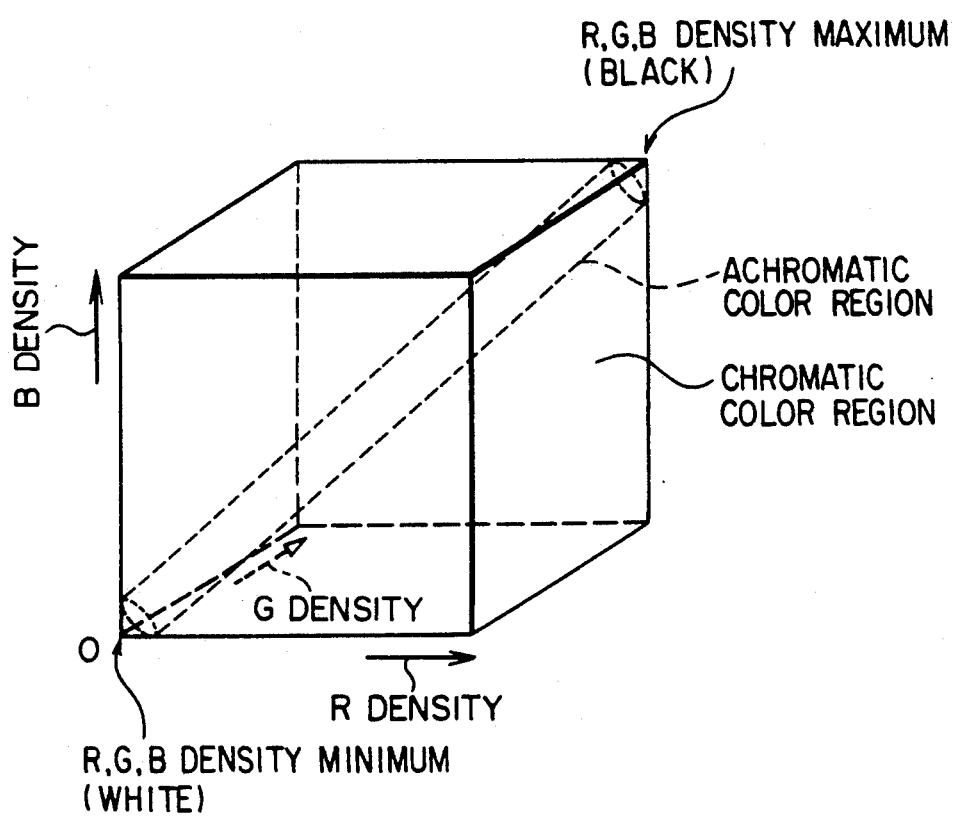
FIG. 8 is a schematic illustration which shows conventional color code generation.

Referring to FIG. 7, the structure and operation of a color copier to which the image processing apparatus of the present invention can be applied, will be explained as follows. The dry color development system is adopted in the color copier. The two component non-contact reversal development system is adopted in this example. In other words, the conventional transfer drum is not used in the example, but the color images are superimposed on the photoreceptor drum which is used to form an image in the electrostatic copier. In this example, in order to accomplish the object of making the apparatus compact, a four-color image of yellow, magenta, cyan, and black is developed while the photoreceptor drum is rotated 4 full turns, and after development the image is transferred to a plain recording paper by rotating the drum one full turn.

When the copy button of the color copier is pressed, the image reading unit A is driven, and the document 101 on the platen glass 128 is optically scanned by the optical system.

This optical system is composed of the carriage 132 on which the light sources 129, 130 Of the halogen lamps and the reflection mirror 131 are mounted and of the movable mirror unit 134 On Which mirrors 133, 133' are mounted in V shape.

The carriage 132 and the movable unit 134 are moved on the slide rail 136 in steady speed and direction by the stepping motor 135.

The optical information (the image information) obtained by illuminating the document 101 with the light sources 129, 130, is sent to the optical information conversion unit 137 through the reflection mirror 131 and the mirrors 133, 133'.

As illustrated in FIG. 7, the standard white plate 138 is provided to the far left side of the back surface of the platen glass 128. The document reading unit A can be normalized by the white signal obtained by optical scanning of the standard white plate 138.

The optical information conversion unit 137 is composed of the lens 139, the prism 140, the two dichroic mirrors 102, 103, CCD 104 by which a color separated image of red can be taken, CCD 105 by which a color separated image of green can be taken, and CCD 106 by which a color separated image of blue can be taken.

The optical signal obtained by the optical system is converged by the lens 139 and Separated into blue optical information and yellow optical information by the dichroic mirror 102 provided in the prism 140. Furthermore, the yellow optical information is separated into red optical information and green optical information by the dichroic mirror 103. In the way described above, the optical color image is separated by the prism 140 into the optical color information of red R, green G, and blue B.

Each color separated image is formed on the light receiving surface of each CCD. The image signal converted into the electrical signal is obtained in this way. After the image signal has been processed in the signal processing system, each color signal is outputted to the image writing unit B.

The signal processing system includes various signal processing circuits, like the density conversion part 1 or the gradation correction part 9 shown in FIG. 1, and an A/D converter.

Image writing unit B has the deflection unit 141. The deflection unit composed of the deflector in which the galvanomirror, the rotary polygon mirror, and a light deflection element like crystal are used, can be used as the deflection unit 141. Deflection scanning is conducted by the deflection unit 141 with the laser beam which is modulated by the color signal.

When the deflection scanning is started, the beam is detected by the laser beam index sensor (not illustrated in the drawing), beam modulation by the first color signal (the yellow signal, for instance) is started. The modulated beam scans the surface of the photoreceptor 142 which is uniformly charged by the electrical charger 154.

The electrostatic latent image corresponding to the first color signal is formed on the photoreceptor 142 by the main scanning conducted by the laser beam and the sub-scanning conducted by the rotation of the photoreceptor 142.

This electrostatic latent image is developed by the developing unit 143 in which yellow toner is contained and the yellow toner image is formed on the photoreceptor. The predetermined developing bias voltage is impressed on the developing unit 143 by a high voltage power source.

When toner supply is necessary, toner is supplied to the developing unit 143 by the toner supply means (not shown in the drawing) controlled by the direction signal sent from CPU (not shown in the drawing) which controls the system. The cleaning blade 147a does not come into contact with the photoreceptor surface, when the photoreceptor having the above-described toner image on it is rotated. The electrostatic latent image of the second color signal (for instance, the magenta signal) is formed in the same way as the first color signal. The second electrostatic latent image is developed to the magenta toner image by the developing unit 144

A predetermined developing bias voltage is impressed on the developing unit 144 by a high voltage power Source.

The electrostatic latent image is formed according to the third color signal (the cyan signal) in the same way. The latent image is developed to a cyan toner image by the developing unit 145 in which the cyan toner is contained. The electrostatic latent image is formed by the fourth color signal (the black signal) and developed by the developing unit 146 in which the black toner is contained in the same way as described above.

Consequently, a multicolor toner image is formed on the surface of the photoreceptor 142 as several color images are superimposed.

Four color toner image formation has been explained above. Of course, a single color toner image or a two color toner image can be formed in the same way.

As for the developing process, an example of the two component noncontact developing process has been explained above, wherein in the two component noncontact developing process, A. C or D. C bias voltage is impressed on the developing units and each toner is transferred to the photoreceptor surface 142.

The predetermined amount of toner is supplied to the developing units 144, 145, 146 according to the direction signal from CPU.

Recording paper P which is delivered from the paper feeding unit 148 through the feeding roller 149 and the timing roller 150, is conveyed to the surface of the photoreceptor 142 in synchronization with the rotation of the photoreceptor 142. Then, the multicolor toner image is transferred onto recording paper P by the transfer electrode 151 on which high voltage is impressed by a high voltage power source. After the image has been transferred, recording paper P is separated from the photoreceptor by the separation electrode 152. After recording paper P has been separated from the photoreceptor, it is conveyed to the fixing unit 153 to be fixed and a fixed color image is obtained.

After the color image has been transferred to recording paper P, the photoreceptor 142 is cleaned by the cleaning unit 147 to be prepared for the next image forming process.

In the cleaning unit 147, the predetermined D. C current voltage is impressed on the metal roll 147b so that the residual toner which was scraped off by the cleaning blade 147a from the surface of the photoreceptor 142 can be easily collected. The metal roll 147b is placed around the surface of the photoreceptor 142 not to contact with the surface. While the surface of the photoreceptor is being cleaned, the cleaning blade 147a is pressed against the photoreceptor surface After cleaning, the cleaning blade is removed from the surface. The auxiliary roller 147c is provided to the photoreceptor 142 in order to remove the unnecessary toner left on the photoreceptor surface when the cleaning blade 147a is removed. Since this auxiliary roller 147c is rotated in the opposite direction to the photoreceptor 142 and pressed against the photoreceptor, the unnecessary toner is completely removed from the photoreceptor surface.

In the example mentioned above, the color image processing apparatus of the present invention is applied to the color copier. Needless to say, the color image processing apparatus of the present invention can be applied to other kinds of apparatus.

In the present invention, when colors are separated into a chromatic color and an achromatic color, the intermediate region is set up and the intermediate region is separated into a chromatic color and an achromatic color according to the kind of the image. As a result, the color image processing apparatus can be realized in which reproduction of low chroma colors can be improved in a color gradation picture and the color ghosting can be eliminated from the black lettered text.

Figure 9:
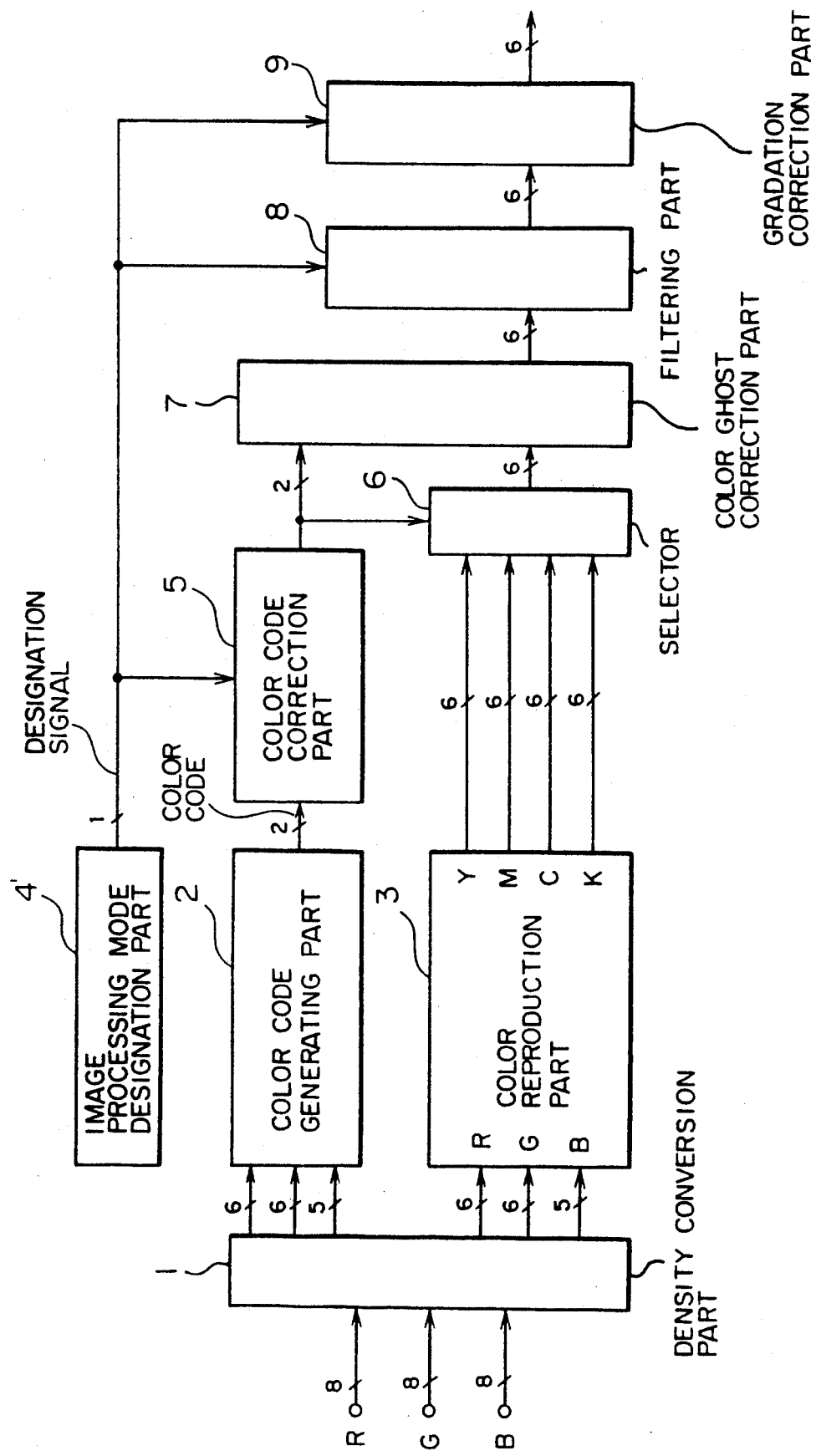
FIG. 9 is a block diagram which illustrates the composition of the second example of the present invention.

FIG. 9 is a block diagram which illustrates the composition of another example of the present invention.

The composition illustrated in FIG. 9 is basically the same as that illustrated in FIG. 1. In FIG. 9, the signal outputted from the image discrimination part 4 is inputted not only to the color code correction part 5 but also to the filtering part 8 and the gradation correction part 9.

In the image discrimination part 4, selection is made from a letter text mode to process a letter text and a color gradation picture mode to process a color gradation picture. In other words, the mode is set in the image discrimination part 4. Mode selection conducted in the image discrimination part 4 is set from the outside of the apparatus, for instance from the operation unit.

In the color code correction part 5, the color code (01) of an intermediate color is corrected to the color code (11) of black or the color code (10) of a chromatic color in accordance with the image processing mode setting signal which is generated in the image discrimination part 4, wherein the image processing mode setting signal is the signal used to select either the color gradation picture mode or the letter text mode. In other words, when a color gradation picture is processed, the color code of an intermediate color is corrected to the color code of a chromatic color so that the reproducibility of low chroma colors can be improved. When a black letter text is processed, the color code of an intermediate color is corrected to the color code of black so that the occurrence of color ghosting can be prevented.

In the filtering part 8 and the gradation correction part 9, processing is conducted according to the mode setting signal. In the filtering part, MTF correction and smoothing processing are conducted.

MTF correction corrects the resolution when it is lowered due to various causes. Accordingly, it is preferable that the amount of MTF correction is changed according to the mode, wherein the mode is the letter text mode or the color gradation picture mode. For example, when the letter text mode is selected, the amount of correction is set large, and when the photographic mode is selected, a small amount of correction is set necessary. In order to change the amount of correction, a convolution filter may be adopted which uses the pixel data of N×N (N=3, 5, or 7) pixels and the coefficient of the filter may be modified. In other words, when a letter text is processed, the convolution filter is used as a high pass filter, and when a color gradation picture is processed, the convolution filter is used as a low filter. When a color gradation picture is processed, smoothing processing is conducted in order to reduce the moire effect.

When a gradation picture is processed in the gradation correction part 9, the gradation ($\gamma$) is lowered in order to obtain gradation characteristics which have a smooth characteristic curve. When a letter text is processed, the gradation ($\gamma$) is set to a higher value in order to obtain a sharp image.

After processing, the image signal is supplied to a printer unit placed outside the apparatus to form an image on a recording paper.

As described above, in the example of the present invention, the color codes are separated into the color codes of a chromatic color, black, white, and an intermediate color and image processing is modified according to the mode. Accordingly, the intermediate color region in a black letter text is changed to a black region. As a result, color ghosting does not occur and a sharp image can be obtained since the resolution is improved. In the case of a color gradation picture, the intermediate color region is changed to a chromatic color region. As a result, a chromatic color of low chroma can be excellently reproduced and an image with superior in gradation reproducibility can be obtained.

Figure 10:
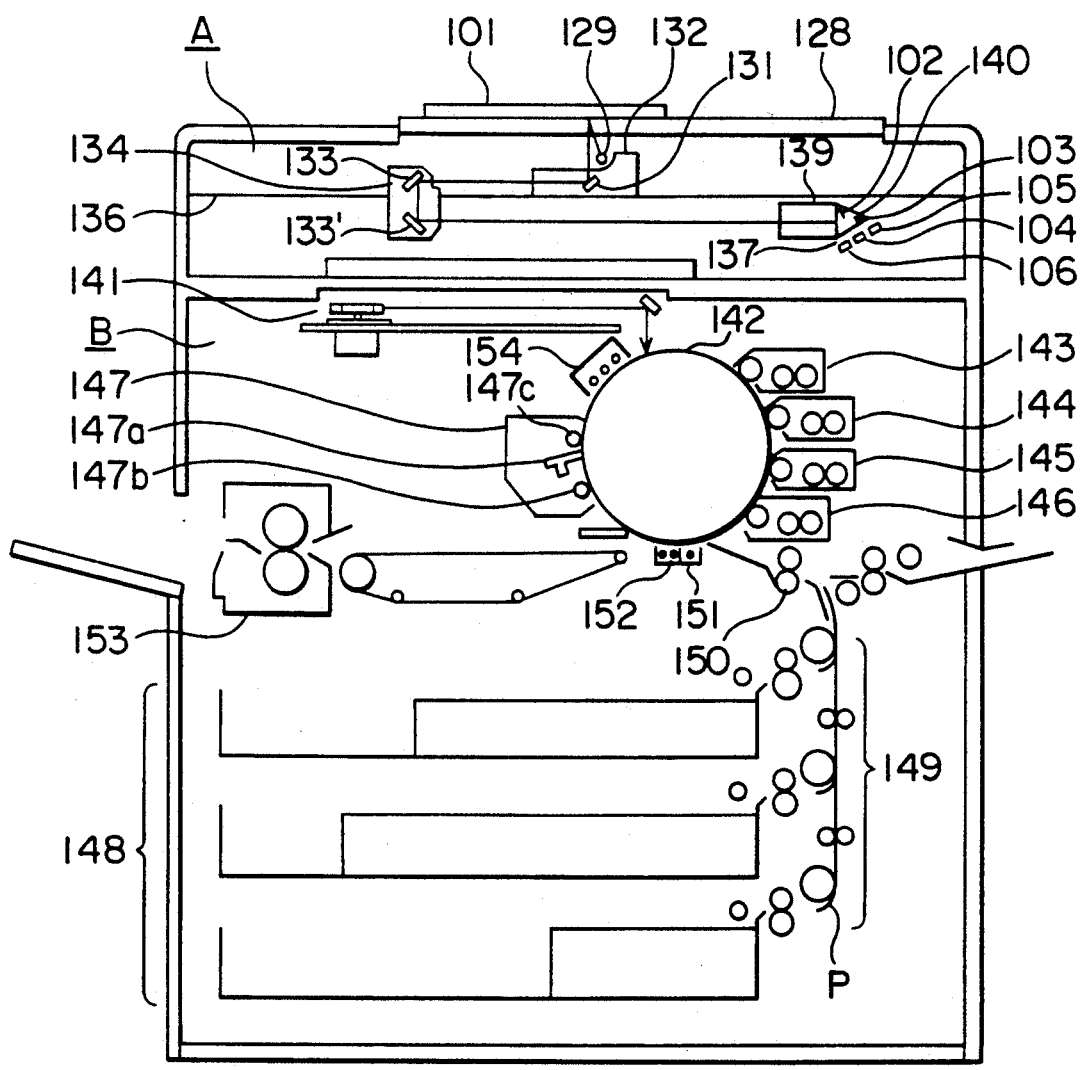
FIG. 10 is a schematic illustration of a color copier to which the second example of the invention can be preferably applied.

Referring to FIG. 10, the structure and motion of a color copier of the present invention will be described as follows. The color copier illustrated in FIG. 10 has the same structure as that illustrated in FIG. 7, and the dry color developing system is adopted to the color copier.

In this example, image processing is modified according to the kind of image. Accordingly, a color image processing apparatus can be realized which is characterized in that; the reproducibility of a color of low chroma is improved in a color gradation picture so that the gradation characteristics are superior; the resolution is improved when a letter text is processed; and the occurrence of color ghosting can be reduced.

The third example of the present invention will be explained in detail.

Figure 11:
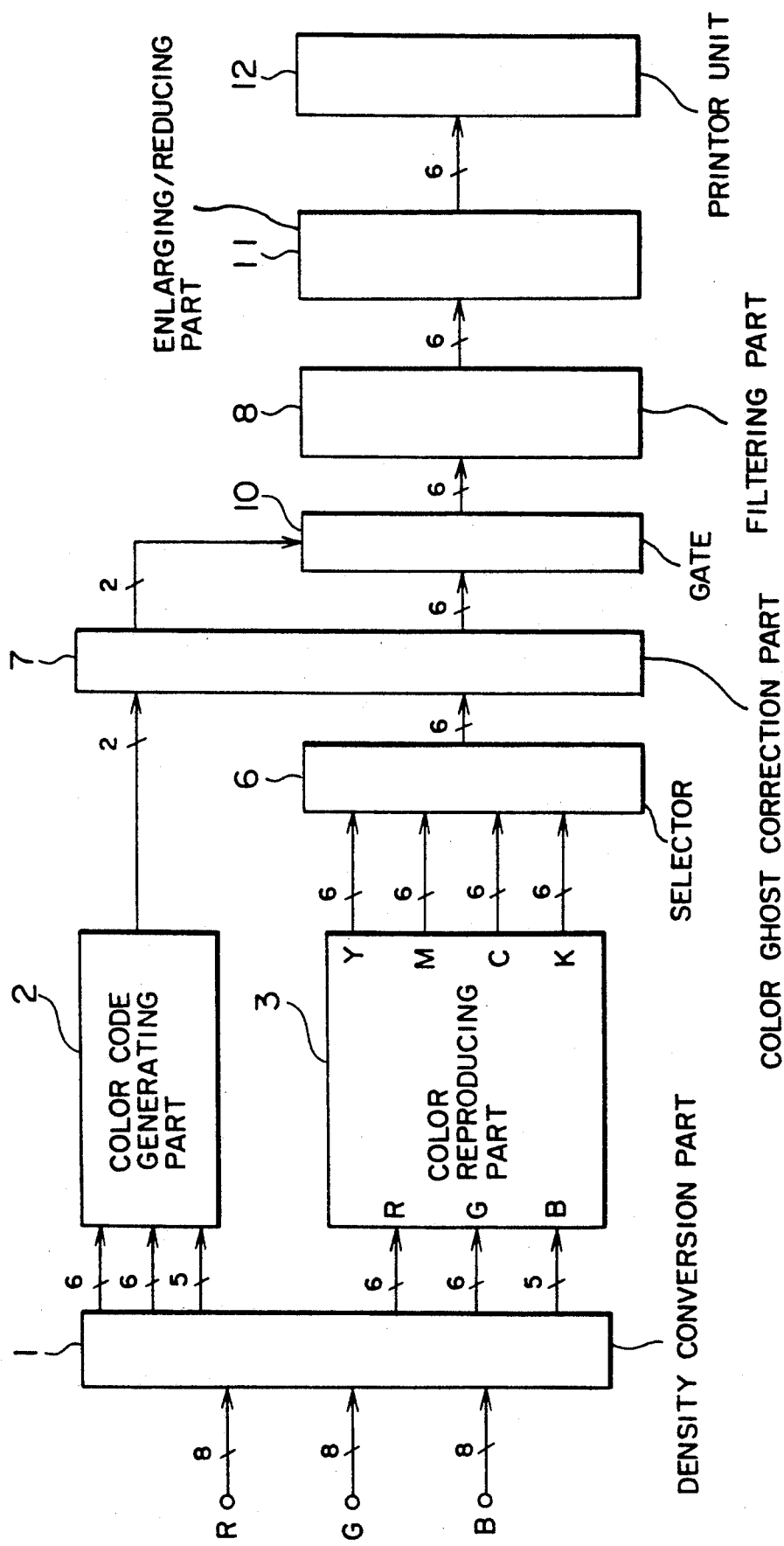
FIG. 11 is a block diagram which illustrates the composition of the third example of the present invention.

FIG. 11 is a block diagram which illustrates the composition of the example of the invention. In FIG. 11, the numeral 1 is a density conversion part which converts the 8-bit digital data of R, G, and B given from the outside of the apparatus into respective 6-bit, 6-bit, and 5-bit digital data. The numeral 2 is a color code generating part which receives the data of R, G, and B from the density conversion part I, discriminates white, black, a chromatic color and an intermediate color, and outputs color codes. The numeral 3 is a color reproduction part which generates the data of Y, M, C and K after receiving the data of R, G and B. The numeral 6 is a selector which selectively passes the density data of Y, M, C and K sent from the color reproduction part 3 according to the scanning code which is not shown in the drawing. The numeral 7 is a color ghost correction part in which color ghosting is corrected and the color code is modified. The numeral 9 is a gate which selectively passes the density data according to the color code. The numeral 8 is a filtering part in which various filtering processing is conducted. The numeral 10 is an enlarging/reducing part in which image enlargement and reduction are conducted. The numeral 11 is a printer unit by which images are recorded.

The motion of the apparatus of this example will be explained as follows.

A document image is read out in the image reading part which is not shown in the drawing and converted into the 8-bit digital data of R, G and B. The digital data of R, G and B is supplied to the density conversion part 1. In the density conversion part 1, the 8-bit digital data is converted into 6-bit, 6-bit, and 5-bit digital data in accordance with human visual characteristics. The data of R, G and B outputted from the density conversion part I is given to the color code generating part 2 and the color reproduction part 3. In the color code generating part 2, the color code is outputted according to the levels of the data of R, G and B, wherein the color code indicates to which color each pixel belongs out of white, black, an achromatic color and an intermediate color. Color code generation in the color code generating part 2 is illustrated in FIG. 2.

Accordingly, the color code generating part 2 outputs 2-bit color codes (white; 00, black: 11, an intermediate color; 01, and a chromatic color; 10).

These color codes are supplied to the color ghost correction part 7. In the color ghost correction part 7, the color code (01) of an intermediate color is modified to either the color code (11) of black or the color code (10) of a chromatic color according to the color pattern. When a color gradation picture is processed, the color code of an intermediate color is modified to the color code of a chromatic color in order to improve the reproducibility of a color of low chroma. When a black letter text is processed which has color ghosting, the color code of an intermediate color is modified to the color code of black in order to prevent the occurrence of color ghosting.

Color ghost correction conducted in the color ghost correction part 7 will be explained as follows. First of all, color ghosting is eliminated by the color pattern method. The reason why the color pattern method has been adopted, is that the color of the color ghosting corresponds to an original color, for example chromatic color ghosting corresponds to original black. When the color pattern method is adopted in order to determine the target pixel, the original color can be discriminated by checking on the combination (the pattern) of the target pixel and its peripheral pixels. An example is shown in FIG. 12. In FIG. 12, the target pixel, the color pattern of the peripheral pixels, and the modified target pixel are shown.

In the first color pattern example in FIG. 12, a target pixel has white pixels to one side, and to the other side a single chromatic pixel and two black pixels. From this, it can be considered that the intermediate color, which is the target pixel, is color ghosting which often appears at the edge of black. Accordingly, the target pixel is modified to black in this example.

On the other hand, in the second color pattern example in FIG. 12, it can be considered that the target pixel is not color ghosting but part of a color gradation picture. Accordingly, the target pixel is modified to a chromatic color.

It is difficult to conduct the above-described processing by a computing circuit. Therefore, the color pattern is arranged in the form of a LUT (Lookup-Table) and is stored in ROM so that the above-described processing can be conducted easily. There are two systems in the color pattern. One is one dimensional system and the other is two dimensional. When the number of colors is identified as N and the number of the peripheral pixels including the target pixel is identified as M, the number of the color patterns can be described as follows.

$$N^M$$

Accordingly, it is possible to use the two dimensional color pattern. However, the number M suddenly increases in this case. In other words, when the two dimensional color pattern is adopted, the number of peripheral pixels of each dimensional direction (the main scanning direction/the sub-scanning direction) is not so high. However, the number of color patterns is increased.

The relation between the pattern size and the number of the color patterns is shown in FIG. 13.

In this example, a one dimensional color pattern of the size $1 \times 7$ (N=4, M=7) is used and color ghosting is eliminated independently in the main scanning direction and the sub-scanning direction. In this case, there is no difference between the occurrence of color ghosting in the main scanning direction and that in the sub-scanning direction. Therefore, the same color pattern is used in both the main scanning direction and the sub-scanning direction.

In this case, the color pattern of the size $1 \times 7$ is selected. It is possible to use a smaller size color pattern such as the color pattern of the size $1 \times 5$ if the color ghosting is not so remarkable. The color ghosting of one pixel can be eliminated by the color pattern of the size $1 \times 5$, and the color ghosting of two pixels can be eliminated by the color pattern of the size $1 \times 7$.

When the color pattern of the size $1 \times 7$ is used, the number of the color patterns is $4^7 = 16384$. In the present invention, the color code is inputted to ROM to be used as the address of ROM.

The color pattern shown as the example is as follows.

| white white white | an intermediate color | a chromatic color | black black |
|---|---|---|---|
| (peripheral pixels) | (target pixel) | (peripheral pixels) | |

The color code pattern shown as the example is as follows.

| white: | white: | white: | an intermediate color: | a chromatic color: | black: | black: |
|---|---|---|---|---|---|---|
| 00: | 00: | 00: | 01: | 10: | 11: | 11: |

The address can be expressed as follows, wherein the above-described pattern is used.

006F (16 digit)

The data to convert the target pixel from an intermediate color into black is stored in the address. The data to convert the target pixel from an intermediate color into a chromatic color is also stored in the address. The data to convert the target pixel from a chromatic color into black is also stored in the address. Accordingly, when all the patterns of $1 \times 7$ are stored as the address and the data to direct whether the target pixel is converted or not, are stored in the memory, LUT used to correct color ghosting can be completed.

Actually, in the case of the pattern 1×7, 14-bit address lines are needed and it is necessary to provide a bipolar ROM which has a capacity of 14-bit input for the address and 2-bit output for the color code. However, a high speed ROM with such a large capacity has not yet come into the market and is expensive.

When a high speed ROM with a large capacity is obtainable, the color pattern data can be stored in the same ROM. It is possible to use 4 ROMs and conduct LUT by selecting one of them according to the color of the leading pixel.

For instance, MB 7143/7144 manufactured by Fujitsu Co. may be used as a high speed bipolar ROM with a large capacity.

When a low speed ROM with a large capacity is used, it is possible to transmit the data to a plurality of SRAMs before the operation and to correct color ghosting with these SRAMs.

Figure 14:
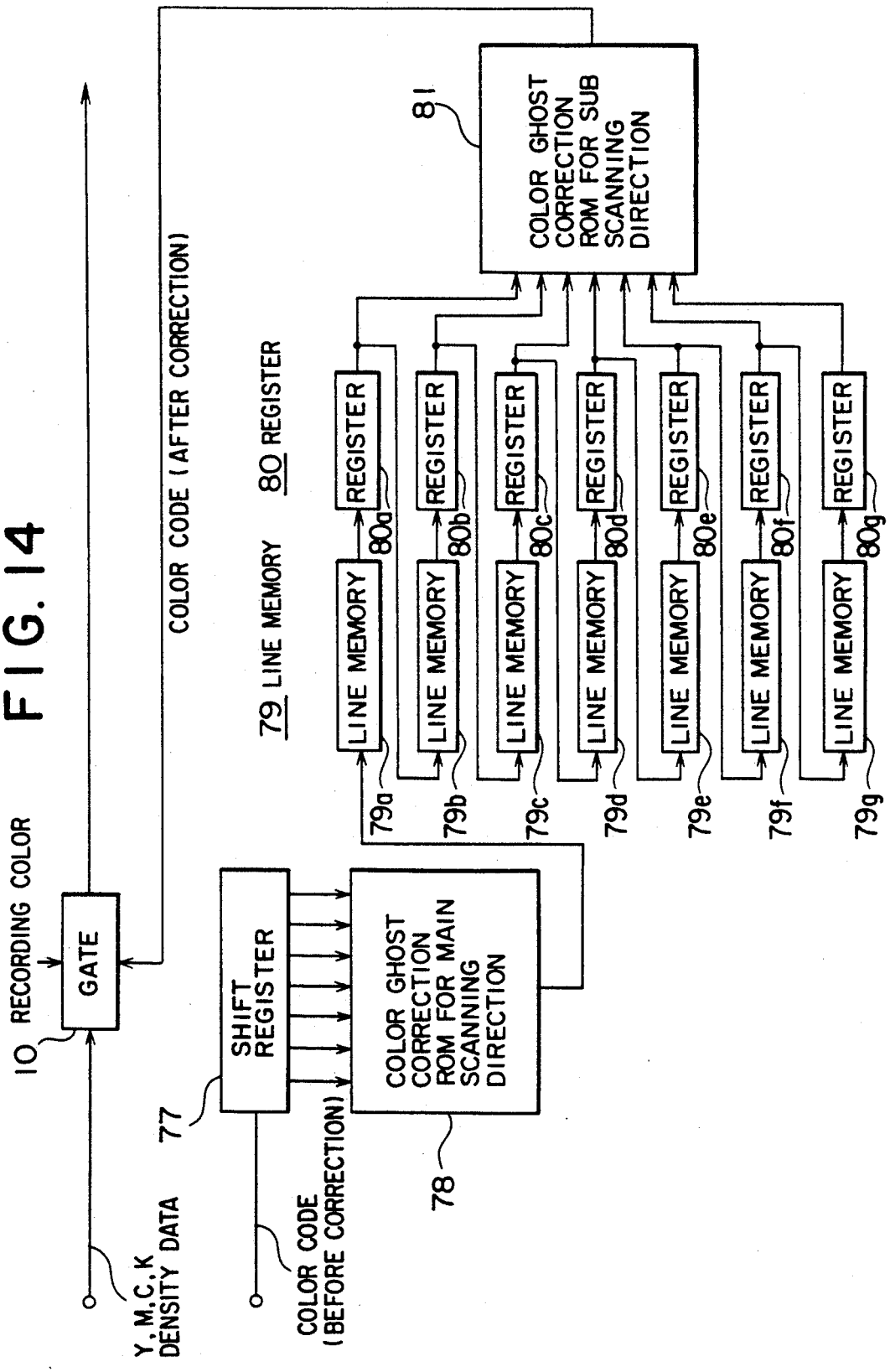
FIG. 14 is a block diagram which shows the general composition of the color ghost correction part.

FIG. 14 is a block diagram which shows one of the examples of the color ghost correction circuit 7 and its peripheral units. Color ghost correction is conducted in the main scanning direction (the horizontal direction) and the sub-scanning direction (the vertical direction).

In this example, the color ghosting in the horizontal and vertical directions is eliminated by utilizing 7 pixels in the horizontal direction and 7 lines of image data in the vertical direction.

Color ghost correction is applied to the color codes in the image data.

For that reason, the color code which is read out from the color correction ROM, is supplied to the shift register 77 with 7-bit composition and made parallel so that the ghosting in the main scanning direction can be corrected. The parallel color code data which amounts to 7 pixel data is supplied to the ROM 78 which is used for detecting the color ghosting in the vertical direction. Then, detection, processing, and modification of color ghosting are conducted, wherein modification is conducted as follows. (an intermediate color→a chromatic color or an achromatic color)

ROM 78 is used in the manner described above.

The serialized color code data is supplied to the line memory 79.

The function of the line memory 79 is to eliminate vertical color ghosting using 7 lines of image data. The registers 80a to 80g are provided corresponding to the line memories 79a to 79g.

The color code data of 7 line memories which has been through the process of coincidence in the memory 79, is supplied to ROM 81 in the next stage to eliminate the vertical ghosting, and impressed on the gate 9 after the vertical color ghosting has been detected.

The density data which is inputted to the selector 6 is either Y, M, C, or K corresponding to the recording color signal (the scanning code). When the density data is either Y, M, or C, the density data is outputted from the gate 10 only when the color code outputted from ROM 81 is the color code of a chromatic color. When the recording signal is K, the density data of K is outputted from the gate 10 only when the color code is that of an achromatic color.

In this example, the following effect can be achieved: not only the color ghosting of a chromatic color which appears on the edge of black letters but also the color ghosting of an achromatic color which appears on the edge of letters of a chromatic color, can be corrected.

As the color code of an intermediate color is used apart from the color codes of a chromatic color and an achromatic color, color ghost correction can be precisely conducted. Accordingly, the accuracy of color ghost correction can be improved without degrading the gradation characteristics of a color gradation picture.

In the printer unit 12, an image is formed in accordance with a document, wherein the density signal is used which has been through the filtering process, gradation correction, and the enlarging/reducing process.

In this example, the color codes are separated into the codes of a chromatic color, black, white, and an intermediate color, and the color code of an intermediate color is modified to the color code of black or a chromatic color. Accordingly, the reproducibility of a color of low chroma can be improved and the accuracy of color ghost correction can be also improved.

Effect of the invention

As explained above, in the present invention, when colors are separated into a chromatic color and an achromatic color, the intermediate color region is set. When color ghost correction is conducted, this intermediate color region is modified to a chromatic color or an achromatic color. Accordingly, a color image processing apparatus can be realized which can improve the reproducibility of a color of low chroma in a color gradation picture and reduce color ghosting in a black lettered text.

What is claimed is:

1. An image processing apparatus, comprising:
means for reading an original image to obtain color image data in a form of pixels and for generating a plurality of color component signals for each pixel, each of said color component signals representing a density level of a corresponding component color;
first classifying means for classifying a color of each pixel as one of a chromatic color, an achromatic color, and an intermediate color on the basis of said color component signals, said intermediate color being a color in a color region between said chromatic color and said achromatic color;
means for detecting a change in density level between pixels on the basis of the density levels of the color component signals; and
second classifying means for further classifying a color of pixels classified as said intermediate color as either said chromatic color or said achromatic color on the basis of said change in density level.

2. The image processing apparatus of claim 1, wherein said reading means includes means for generating red, green, and blue color component signals as the plurality of color component signals.

3. The image processing apparatus of claim 2, wherein said detecting means includes means for detecting a change in density level on the basis of the density level of one of said red, green, and blue color component signals.

4. The image processing apparatus of claim 2, wherein said detecting means includes means for detecting a change in density level on the basis of the density level of said green color component signal.

5. An image processing apparatus, comprising:
means for reading an original image in a form of pixels and for generating a plurality of color component signals for each pixel, each of said color component signals representing a density level of a corresponding component color;

first classifying means for classifying a color of each pixel as one of a chromatic color, an achromatic color, and an intermediate color on the basis of said color component signals, an intermediate color being a color in a color region between said chromatic color and said achromatic color;

means for selecting one of a plurality of image processing modes, the plurality of image processing modes including a letter mode to process a text image and a picture mode to process a color gradation picture image; and second classifying means for further classifying a color of pixels classified as said intermediate color as either said chromatic color or said achromatic color in accordance with a selected image processing mode.

6. The apparatus of claim 5 wherein the second classifying means includes means for classifying the color of pixels classified as said intermediate color as said achromatic color when said letter mode is selected.

7. The apparatus of claim 5 wherein the second classifying means includes means for classifying the color of pixels classified as said intermediate color as said chromatic color when said picture mode is selected.

* * * * *